(12) United States Patent
Kim et al.

(10) Patent No.: US 9,871,593 B2
(45) Date of Patent: Jan. 16, 2018

(54) REMOTE RADIO HEAD

(71) Applicant: KMW Inc., Hwaseong, Gyeonggi-Do (KR)

(72) Inventors: Duk-Yong Kim, Gyeonggi-do (KR); Bea-Mook Jeong, Gyeonggi-do (KR); Sang-Hyo Kang, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 43 days.

(21) Appl. No.: 15/062,651

(22) Filed: Mar. 7, 2016

(65) Prior Publication Data

US 2016/0191164 A1 Jun. 30, 2016

Related U.S. Application Data

(63) Continuation of application No. PCT/KR2014/008385, filed on Sep. 5, 2014.

(30) Foreign Application Priority Data

Sep. 6, 2013 (KR) .................. 10-2013-0107476
Oct. 2, 2013 (KR) .................. 10-2013-0117762

(51) Int. Cl.
*H04B 10/00* (2013.01)
*H04B 10/2575* (2013.01)
*G02B 6/42* (2006.01)

(52) U.S. Cl.
CPC ..... *H04B 10/25759* (2013.01); *G02B 6/4293* (2013.01)

(58) Field of Classification Search
CPC .................. G02B 6/4293; H04B 10/25759
(Continued)

(56) References Cited

U.S. PATENT DOCUMENTS 5,467,420 A * 11/1995 Rohrmann ........... G02B 6/3817
  385/101
5,557,698 A * 9/1996 Gareis ................ H01B 11/1891
  385/100

(Continued)

FOREIGN PATENT DOCUMENTS

JP  2004-325783 A  11/2004
JP  2005-085568 A   3/2005

(Continued)

OTHER PUBLICATIONS

Machine translation of Japanese Office Action dated Mar. 17, 2017 in corresponding Japanese Patent Application No. JP 2016-540817.*

(Continued)

*Primary Examiner* — Juan A Torres
(74) *Attorney, Agent, or Firm* — Mintz Levin Cohn Ferris Glovsky and Popeo, P.C.; Kongsik Kim; Colleen H. Witherell

(57) ABSTRACT

A remote radio head is provided. The remote radio head includes at least one integrated connection terminal for integrating and receiving at least one optical signal with at least one power source, a power supply unit which receives and supplies the power source by converting into an internal driving power source of a corresponding remote radio head, a photoelectric/electrooptic conversion unit for receiving and converting the optical signal into an electric signal, a framer for restoring the electric signal converted in the photoelectric/electrooptic conversion unit according to a preset signal demodulation format, a digital signal processing unit receives a signal outputted from the framer to adjust a waveform and a level in a digital level and a transmission and reception signal conversion module which converts a signal into a high-frequency transmission wireless signal, (Continued)

and amplifies the signal at a high power to output the signal to an antenna side.

6 Claims, 6 Drawing Sheets

(58) Field of Classification Search
USPC .......................................................... 398/115
See application file for complete search history.

(56) References Cited

U.S. PATENT DOCUMENTS

| | | | |
|---|---|---|---|
| 7,047,028 B2 | 5/2006 | Cagenius | |
| 2004/0218873 A1 | 11/2004 | Nagashima et al. | |
| 2008/0003868 A1* | 1/2008 | Cairns | H01R 13/5219 439/552 |
| 2009/0191891 A1* | 7/2009 | Ma | G01S 1/68 455/456.1 |
| 2009/0215492 A1 | 8/2009 | Pistner et al. | |
| 2011/0268452 A1* | 11/2011 | Beamon | G02B 6/0288 398/117 |
| 2011/0310881 A1 | 12/2011 | Kenington | |
| 2013/0077966 A1 | 3/2013 | Gelbman et al. | |

FOREIGN PATENT DOCUMENTS

| | | |
|---|---|---|
| JP | 2012-142718 A | 7/2012 |
| JP | 2012-235439 A | 11/2012 |
| KR | 10-1017085 B1 | 2/2011 |
| KR | 10-1105193 B1 | 1/2012 |
| KR | 10-1292580 B1 | 8/2013 |
| WO | 2012/024343 A1 | 2/2012 |
| WO | 2013/070613 A1 | 5/2013 |

OTHER PUBLICATIONS

Japanese Office Action dated Mar. 17, 2017 in corresponding Japanese Patent Application No. JP 2016-540817.

\* cited by examiner

REMOTE RADIO HEAD

CROSS REFERENCE TO RELATED APPLICATIONS

This application is a continuation of International Application No. PCT/KR2014/008385 filed on Sep. 5, 2014, which claims priorities to Korean Applications No. 10-2013-0107476 filed on Sep. 6, 2013 and No. 10-2013-0117762 filed on Oct. 2, 2013, which applications are incorporated herein by reference.

TECHNICAL FIELD

The present disclosure relates to a wireless access node system such as a base station, a relay station, or a small-sized base station in a wireless communication (e.g., PCS, Cellular, CDMA, GSM, LTE, or the like) network and, more particularly, to a Remote Radio Head (RRH) which is installed on a side of an antenna in the wireless access node system.

BACKGROUND ART

Generally, a wireless access node system such as a base station includes a base station main body part for transmission and reception signal processes and a plurality of radiation elements, and has been classified with an antenna transmitting and receiving a wireless signal. The base station part is installed at a low position on the ground, the antenna part is installed at a high position such as a roof of a building or a tower, and the base station part may be connected to the antenna part through a feed cable.

Recently, on the strength of the increasing ease of tower installation according to the shrinking and lightening of devices for processing wireless signals, a structure in which a Remote Radio Head (RRH) processing a transmission and reception wireless signal is installed at the front end of an antenna has widely been applied so as to compensate for a cable loss when a signal is transmitted between the antenna and the base station main body part.

That is, the base station main body part for processing the transmission and reception signal is divided into an RF signal processing part and a baseband signal processing part, only the baseband signal processing part is included in the base station main body part, and the RF signal processing part is included in the remote radio head. In this event, the base station main body part may be considered as a "baseband signal processing equipment". In this event, generally, the base station main body part (baseband signal processing equipment) is connected to the remote radio head through an optical cable transferring the transmission and reception signal in an optical communication scheme in order to prevent a mutual transmission signal loss, and a coaxial cable which is a power supply cable for supplying an operation power source of the remote radio equipment.

FIG. 1 illustrates an example of a schematic whole block configuration of a base station where a remote radio head is installed. In an example of FIG. 1, a structure in which the base station divides a corresponding cell into three sectors and provides a service has been described. Referring to FIG. 1, each of first to third antennas 11, 12, and 13 is installed for each sector in a pillar of a tower, and each of first to third remote radio heads 21, 22, and 23 is installed for the each first to third antennas 11, 12, and 13. Between the first to third remote radio heads 21, 22, and 23 and a baseband signal processing equipment 1, first to third optical cables 213, 223, and 233 for transmitting a transmission and reception signal in an optical communication scheme are connected to first to third coaxial cables 214, 224, and 234 for supplying power.

As shown in FIG. 1, it is noted that in a base station of a structure having three sectors, three optical cables 213, 223, and 233 and three coaxial cables 214, 224, and 234 are installed between the baseband signal processing equipment 1 and the remote radio heads 21, 22, and 23 so that a total of six cables, which are a relatively large number, should be installed. As described above, an increase in the number of installation cables makes a cable connection task, which takes place in a high altitude task, more difficult and, especially, equipment costs and installation costs of a cable significantly increase.

FIG. 2 is a bottom view of a configuration of a first remote radio head 21 in FIG. 1. Referring to FIG. 2, the remote radio head 21 includes one or more optical cable connection terminals (sockets) 211 for connecting one or more optical cables (a connector thereof) and a coaxial cable terminal connection terminal (sockets) 212 for connecting a coaxial cable (a connector thereof). FIG. 2 illustrates an example in which four optical cable connection terminals 211 are included, and, for example, is a structure in which multiple (i.e., four) optical cables are installed to satisfy a large capacity a data transmission standard required for LTE-A service support.

As described above, the multiple optical cables may be connected to each of the remote radio heads 21, 22, and 23. In that case, it can be known that problems in cable connection tasks and equipment and installation cost of the cable increase.

SUMMARY

In accordance with an aspect of the present disclosure, a remote radio head for reducing an installation task and costs thereof is provided by reducing the number of baseband signal processing equipment and connection cables.

In accordance with an aspect of the present disclosure, a remote radio head is provided. The remote radio head includes: at least one integrated connection terminal that integrates at least one optical signal with at least one power, and receives the integrated optical signal; a power supply unit that receives a power source from the integrated connection terminal, converts the received power source into an internal driving power source of a corresponding remote radio head, and supplies the converted power source; a photoelectric/electrooptic conversion unit that receives an optical signal output from the integrated connection terminal and converts the received optical signal into an electrical signal; a framer that reconstructs the electrical signal converted in the photoelectric/electrooptic conversion unit according to a pre-configured signal demodulation format; a digital signal processing unit that receives the signal output from the framer and performs level adjustment and waveform adjustment in a digital level; and a transmission and reception signal conversion module that converts a signal output from the digital signal processing unit into a wireless transmission signal of a high frequency, amplifies the converted signal to have a high output power, and outputs the amplified signal to a side of an antenna.

DETAILED DESCRIPTION

Hereinafter, an exemplary embodiment according to the present disclosure will be described in detail with reference to the accompanying drawings. Various specific definitions found in the following description are provided only to help general understanding of the present disclosure, and it is apparent to those skilled in the art that the present disclosure can be implemented without such definitions.

Figure 1:
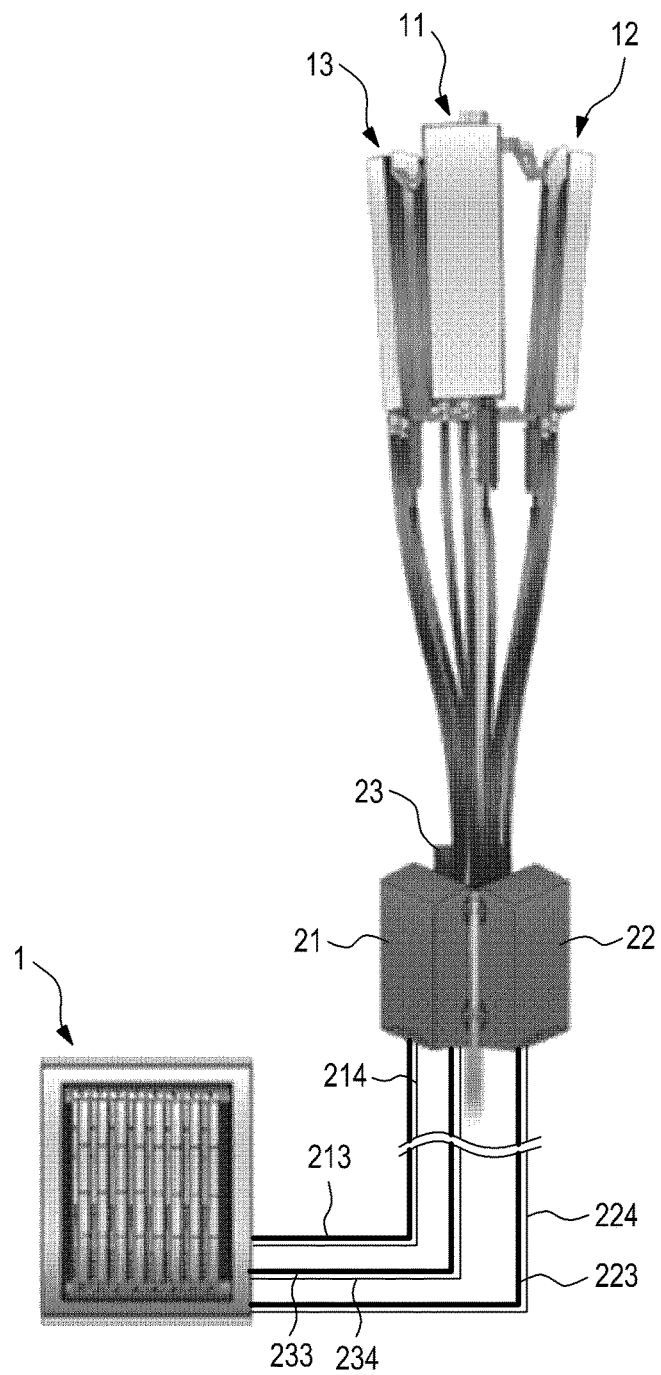
FIG. 1 illustrates an example of a schematic whole block configuration of a base station where a remote radio head is installed.
Figure 3:
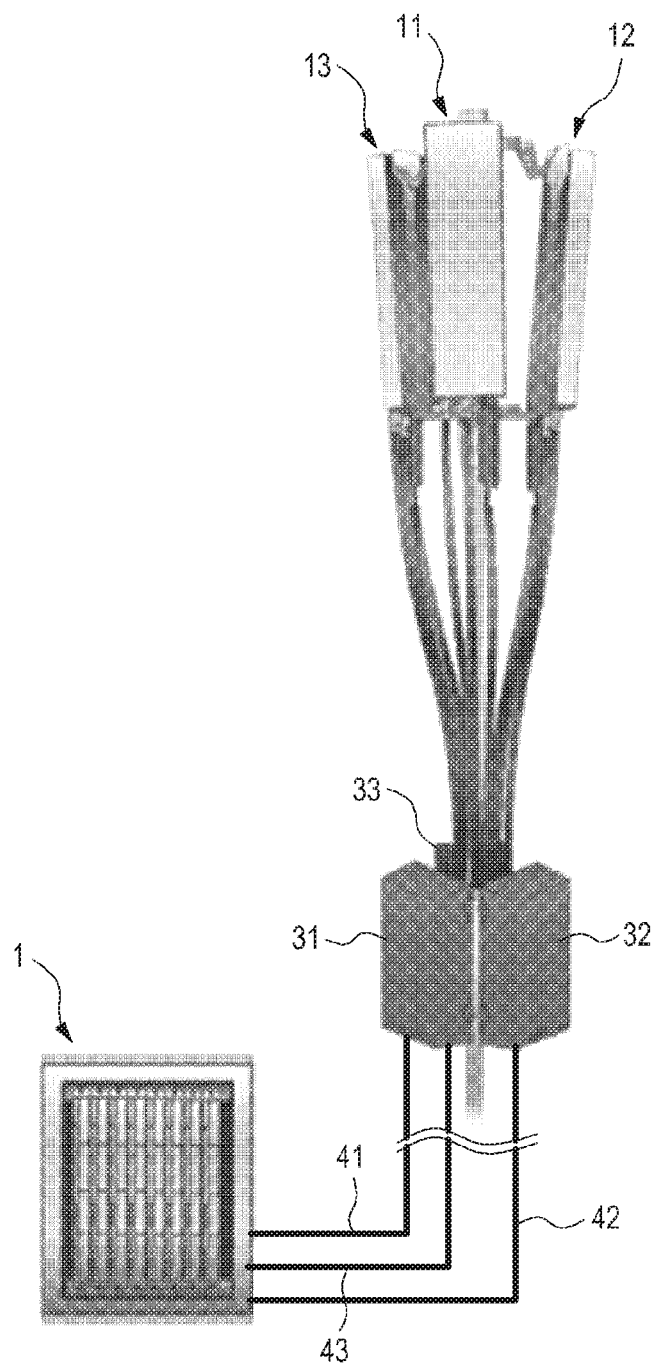
FIG. 3 is a view illustrating a schematic whole block configuration of a base station in which a remote radio head is installed according to an embodiment of the present disclosure.

FIG. 3 is a view illustrating a schematic whole block configuration of a base station in which a remote radio head is installed according to an embodiment of the present disclosure, and in an example of FIG. 3, a structure in which the base station divides a corresponding cell into three sectors and provides a service is described. Referring to FIG. 1, each of first to third antennas 11, 12, and 13 is installed for each sector in a pillar of a tower, and each of first to third remote radio heads 31, 32, and 33 according to an embodiment of the present disclosure is installed for the each first to third antennas 11, 12, and 13. The first to third remote radio heads 31, 32, and 33 and a baseband signal processing equipment 1 are connected respectively through each of first to third opto-electric hybrid cables 41, 42, and 43.

The first to third opto-electric hybrid cables 41, 42, and 43, in which optical fibers and power supply lines are complexly configured, have a structure in which a transmission and reception signal is transmitted in an optical communication scheme through the optical fibers, and a power source is supplied using the power supply lines.

Figure 4:
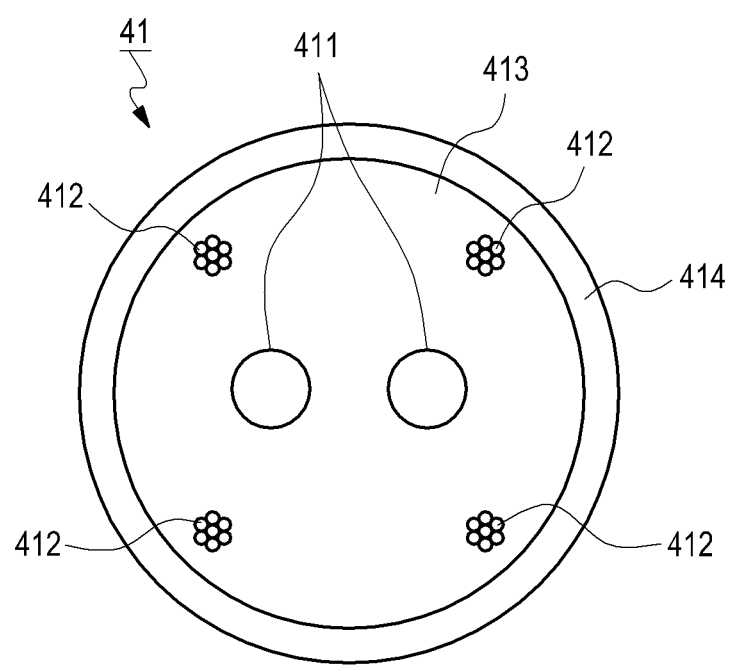
FIG. 4 is an internal cross-sectional view illustrating an opto-electric hybrid cable in FIG. 3.

FIG. 4 is an internal cross-sectional view illustrating a first opto-electric hybrid cable 41 in FIG. 3. Referring to FIG. 4, a first opto-electric hybrid cable 41 has a pair of power supply lines 411 arranged in an inner central part thereof, and a plurality of (e.g., four in FIG. 5) optical fibers 412 are located around the power supply lines 411 while being adequately spaced apart from each other by a filler 413. Further, the outmost sides of the power supply lines are wrapped by a sheath 414. The plurality of optical fibers 412 may be effectively implemented by a bundle of optical fibers respectively. Further, the number of the plurality of optical fibers 412 may be properly configured according to a structure of a corresponding antenna and a signal transmission standard.

As shown in FIG. 4, the first opto-electric hybrid cable 41 may be configured, and similarly, the second and third opto-electric hybrid cables 42 and 43 shown in FIG. 3 may be also configured.

Figure 5:
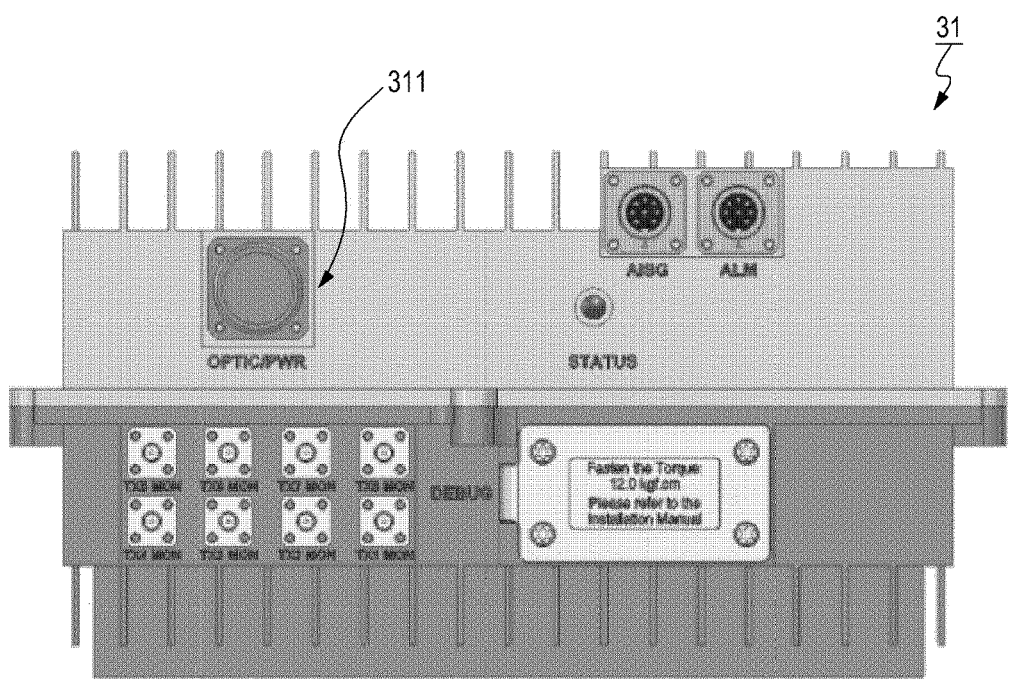
FIG. 5 is a bottom view of a configuration of a first remote radio head in FIG. 3.

FIG. 5 is a bottom view of a configuration of a first remote radio head 31 in FIG. 3. Referring to FIG. 5, unlike the prior art, the remote radio head 31 includes one integrated connection terminal (socket) 311 for being connected to the opto-electric hybrid cable (a connector thereof) 41 as shown in FIG. 4. A technology related to the integrated connection terminal 311 may be disclosed, for example, in a Korean patent application No. 2009-0115539 (title: opto-electric hybrid connector, applicant: Postech, inventor: Lee Soo Young, filing data: Nov. 27, 2009), which has been filed before the present application.

As shown in FIG. 5, a first remote radio head 31 may be configured, and similarly, the second and third remote radio heads 32 and 33 shown in FIG. 3 may be also configured.

As shown in FIGS. 3 to 5, in an embodiment of the present disclosure, one remote radio head is connected to a baseband signal processing equipment through one opto-electric hybrid cable, and it may be known that only one (opto-electric hybrid) cable is substantially required, in comparison with the prior art, between the remote radio head and the baseband signal processing equipment. In this event, opto-electric hybrid connectors for transferring a power source and an optical signal through power supply lines and optical fibers are configured at both ends of the opto-electric hybrid cable. Further, an integrated connection terminal is also arranged in the baseband signal processing equipment, and, at the time of working, opto-electric hybrid connectors at both ends of the opto-electric hybrid cable are coupled to opto-electric hybrid connection terminals of the baseband signal processing equipment and the remote radio head, respectively, so that an installation can be completed.

Figure 6:
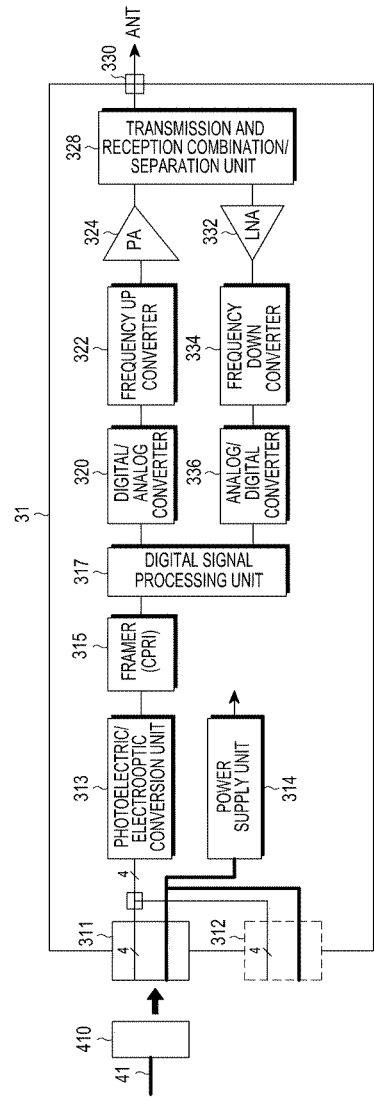
FIG. 6 is a detailed block diagram of a configuration of a remote radio head according to an embodiment of the present disclosure.

FIG. 6 illustrates a detailed block diagram of a configuration of a remote radio head according to an embodiment of the present disclosure, for example, an internal detailed structure of the first remote radio head 31 in FIG. 3. Referring to FIG. 6, a configuration on the side of a transmission signal and a power source from a baseband signal processing equipment to a remote radio head 31 will firstly be described. The remote radio head 31 according to an embodiment of the present disclosure includes: an integrated connection terminal 311 which has a structure of being coupled to an opto-electric hybrid connector 410 of an opto-electric hybrid cable 41, integrates an optical signal provided from the baseband signal processing equipment with power, and receives the integrated optical signal; a power supply unit 314 which receives a power source from the integrated connection terminal 31 and supplies the converted power source to each function unit by converting the received power source into an internal driving power source of the corresponding remote radio head 31; a photoelectric/electrooptic conversion unit 313 which receives an optical signal output from the integrated connection terminal 311 so as to convert the received optical signal into an electrical signal; a framer 315 which reconstructs the electrical signal converted in the photoelectric/electrooptic conversion unit 313 according to a pre-configured (i.e., corresponding to a signal modulation format in the baseband signal processing module) signal demodulation format; and a digital signal processing unit 317 which receives the signal output from the framer 315 so as to performs level adjustment and waveform adjustment in a digital level, wherein a digital signal output from the digital signal processing unit 317 is converted into a wireless transmission signal of a high frequency through a transmission and reception signal conversion module, is amplified at a high output power so as to output the signal to a side of an antenna.

The photoelectric/electrooptic conversion unit 313 may be implemented by, for example, a structure of a Small Form-Factor Pluggable optical transceiver and the framer 315 may have, for example, a structure of serial-to-parallel/parallel-to-serial converter according to a Common Public Radio Interface (CPRI) standard. In this event, the photoelectric/electrooptic conversion unit 313 may be implemented by a plurality of SFP optical transceivers in order to correspond to a plurality of optical fibers in an opto-electric hybrid cable, and the framer 315 may be implemented by a plurality of serial-to-parallel/parallel-to-serial converters.

The digital signal processing unit 317 may include sub-components performing a digital up conversion function of amplifying a level of a digital signal, a Crest Factor Reduction (CRF) function for crest factor reduction, and a Digital Pre-Distortion (DPD) function of previously distorting a digital signal. The digital signal processing unit 317 may be implemented by a Digital Signal Processor (DSP) element or a Field Programmable Gate Array (FPGA). Further, in this event, a feedback circuit (not shown) providing a feedback signal from an amplified transmission signal after the digital signal processing unit 317 in order to perform the DPD function may be further included in the digital signal processing unit 317.

Meanwhile, a transmission and reception signal conversion module for converting a digital signal output in the digital signal processing unit 317 into a wireless transmission signal of a high frequency may include: a digital/analog converter 320 which converts an output signal of the digital signal processing unit 317 into an analog signal of an Intermediate Frequency (IF) so as to output the analog signal; a frequency up converter 322 which combines an IF signal output from the digital/analog converter 320 with a local oscillation signal so as to convert the combined signal into a high frequency signal of a corresponding transmission frequency band; a transmission amplifier 324 at a high output power which receives an output of the frequency up converter 322 so as to amplify a high frequency signal in a transmission power level; a transmission and reception combination/separation unit 328 which provides a transmission signal of a high frequency output from the transmission amplifier 324 to a side of an antenna through an antenna connection terminal 330, separates a reception signal provided from the side of the antenna through the antenna connection terminal 330 from a path of the transmission signal so as to output the signal; a Low Noise Amplifier (LNA) 332 which low-noise amplifies a reception signal separated and output from the transmission and reception combination/separation unit 328; a frequency down converter 334 which combines a reception signal of a high frequency output from a reception amplifier with the local oscillation signal so as to convert the combined signal into a signal of the IF; and an analog/digital converter 336 which converts a signal converted in the frequency down converter 334 into an analog/digital signal so as to provide the converted signal to the digital signal processing unit 317.

As described above, the transmission and reception combination/separation unit 328 may be implemented through a duplexer for separating transmission and reception frequency bands. Further, a corresponding antenna may have a Multi Input Multi Output (MIMO) structure, and the antenna connection terminal may be implemented by a plurality of terminals. Similarly, the transmission and reception combination/separation unit 328 may be implemented by a plurality of duplexers and the transmission amplifier 324 and the reception amplifier 332 may be implemented by a plurality of amplification elements.

Meanwhile, the reception signal in the digital signal processing unit 317 is provided to the framer 315 through the digital level adjustment, the framer 315 modulates and outputs the reception signal according to a pre-configured transmission format, and the photoelectric/electrooptic conversion unit 313 generates an optical signal according to a signal output and modulated from the framer 315 and transmits the generated optical signal to the side of the baseband signal processing equipment through the integrated connection terminal 311.

A configuration and operation of the remote radio head according to an embodiment of the present disclosure are made as described above, and while the present disclosure has been shown and described with reference to certain embodiments thereof, it will be understood that various changes in form and details may be made therein without departing from the spirit and scope of the present disclosure as defined by the appended claims.

Figure 2:
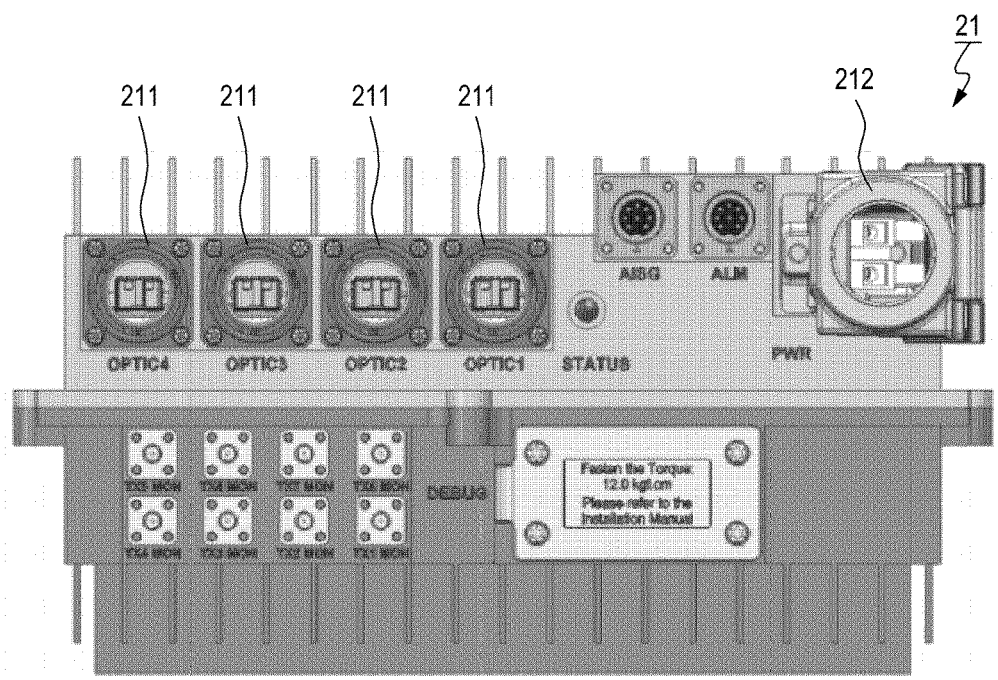
FIG. 2 is a bottom view of a configuration of a first remote radio head in FIG. 1.

For example, an example of FIG. 6 illustrates the integrated connection terminal 311 and the sub-integrated connection terminal 312 in which an optical signal and power are connected in parallel are further installed. The sub-integrated connection terminal 312 may form signal paths in parallel by being coupled to providing paths of an optical signal and power of the integrated connection terminal 311. The structure corresponds to, especially a structure suitable for being applied to repeaters, and the repeaters may form a network in which a plurality of antennas and remote radio heads installed therein are connected in parallel in a daisy chain form. In this event, a neighboring remote radio head may be easily connected through the sub-integrated connection terminal 312. In comparison with the conventional structure as shown in FIG. 2, in a case in which the remote radio heads are connected in the daisy chain form in the prior art, for example, a plurality of additional optical cable connection terminals and additional coaxial cable connection terminals should be included, but it is not easy to ensure a place to arrange the connection terminals.

Further, in the description, although it has been described that the remote radio head of the present disclosure is identical to an RRH, it will be understood that the remote radio head of the present disclosure is installed on the side of or at the front end of the antenna, and may be considered as an equipment of any name, which processes an RF signal, by being separated from the remote baseband signal processing equipment.

As described above, a remote radio head according to the present disclosure can reduce the number of baseband signal processing equipment and connection cables so that an installation task and costs thereof can be reduced.

In addition, various modifications and variations can be made without departing from the scope of the present disclosure, and the scope of the present disclosure shall not be determined by the above-described embodiments and has to be determined by the following claims and equivalents thereof.

What is claimed is:

1. A remote radio head comprising:
   at least one integrated connection terminal that integrates at least one optical signal with at least one power source so as to receive the integrated optical signal;
   a power supply unit that receives power source from the integrated connection terminal, and supplies the converted power source by converting the received power source into internal driving power source of a corresponding remote radio head;
   a photoelectric/electrooptic conversion unit that receives an optical signal output from the integrated connection terminal so as to convert the received optical signal into an electrical signal;
   a framer that reconstructs the electrical signal converted in the photoelectric/electrooptic conversion unit according to a pre-configured signal demodulation format;

a digital signal processing unit that receives the signal output from the framer so as to perform level adjustment and waveform adjustment in a digital level; and a transmission and reception signal conversion module that converts a signal output from the digital signal processing unit into a wireless transmission signal of a high frequency, amplifies the signal at a high output power so as to output the signal to a side of an antenna.

2. The remote radio head according to claim 1, wherein the photoelectric/electrooptic conversion unit is implemented by a structure of at least one Small Form-factor Pluggable (SFP) optical transceiver, and the framer has a structure of at least one serial-to-parallel/parallel-to-serial converter according to a Common Public Radio Interface (CPRI) standard.

3. The remote radio head according to claim 1, wherein the digital signal processing unit includes sub-components performing a digital up conversion function of amplifying a level of a digital signal, a Crest Factor Reduction (CRF) function for crest factor reduction, and a Digital Pre-Distortion (DPD) function of previously distorting a digital signal.

4. The remote radio head according to claim 1, further comprising:

a sub-integrated connector that is connected to an optical signal and power of the integrated connection terminal in parallel.

5. The remote radio head according to claim 1, wherein the transmission and reception signal conversion module comprises:

a digital/analog converter that converts an output signal of the digital signal processing unit into an analog signal of an Intermediate Frequency (IF) so as to output the analog signal;

a frequency up converter that converts an IF signal output from the digital/analog converter into a high frequency signal of a transmission frequency band;

a transmission amplifier that receives an output of the frequency up converter so as to amplify the received output in a transmission power level;

a transmission and reception separation unit that provides the output from the transmission amplifier to a side of an antenna through an antenna connection terminal, and separates a reception signal provided from the side of the antenna through the antenna connection terminal from a path of the transmission signal so as to output the signal;

a reception amplifier that amplifies a reception signal separated and output from the transmission and reception separation unit;

a frequency down converter that converts a reception signal of a high frequency output from the reception amplifier into a signal of an intermediate frequency; and an analog/digital converter that converts the signal converted in the frequency down converter into an analog/digital signal so as to provide the signal to the digital signal processing unit.

6. The remote radio head according to claim 5, wherein the digital signal processing unit provides a reception signal provided in the analog/digital converter to the framer, the framer modulates a reception signal provided from the digital signal processing unit according to a preconfiguration transmission format so as to output the signal, and the photoelectric/electrooptic conversion unit generates an optical signal according to a signal output and modulated in the framer so as to transmit the generated optical signal to a side of the baseband signal processing equipment through the opto-electric hybrid connection terminal.

* * * * *